US008852547B2

(12) United States Patent
Ma et al.

(10) Patent No.: US 8,852,547 B2
(45) Date of Patent: Oct. 7, 2014

(54) PROCESSES FOR THE RECOVERY OF CATALYTIC METAL AND CARBON NANOTUBES

(75) Inventors: Jun Ma, Lexington, MA (US); Robert Hoch, Hensonville, NY (US)

(73) Assignee: Hyperion Catalysis International, Inc., Cambridge, MA (US)

(*) Notice: Subject to any disclaimer, the term of this patent is extended or adjusted under 35 U.S.C. 154(b) by 574 days.

(21) Appl. No.: 12/358,772

(22) Filed: Jan. 23, 2009

(65) Prior Publication Data

US 2009/0208391 A1  Aug. 20, 2009

Related U.S. Application Data

(60) Provisional application No. 61/023,672, filed on Jan. 25, 2008.

(51) Int. Cl.
*D01F 9/12* (2006.01)
*C01B 31/02* (2006.01)
*B01J 38/48* (2006.01)
*B82Y 40/00* (2011.01)
*B01J 38/60* (2006.01)
*B01J 23/96* (2006.01)
*B01J 21/20* (2006.01)
*B82Y 30/00* (2011.01)
*B01J 23/44* (2006.01)
*B01J 21/18* (2006.01)

(52) U.S. Cl.
CPC ............ B01J 38/48 (2013.01); C01B 31/026 (2013.01); B82Y 40/00 (2013.01); B01J 38/60 (2013.01); B01J 23/96 (2013.01); B01J 21/20 (2013.01); B01J 23/44 (2013.01); B82Y 30/00 (2013.01); *B01J 21/185* (2013.01)
USPC .................... 423/447.3; 423/447.1; 502/27

(58) Field of Classification Search
USPC .................... 423/447.1, 447.3; 502/27
See application file for complete search history.

(56) References Cited

U.S. PATENT DOCUMENTS

| | | | |
|---|---|---|---|
| 3,856,912 A | 12/1974 | Vesely | |
| 3,999,983 A | 12/1976 | Grosbois et al. | |
| 4,069,040 A | 1/1978 | Thomas et al. | |
| 4,072,628 A * | 2/1978 | Kruse et al. | 502/27 |
| 4,077,800 A | 3/1978 | Peka et al. | |
| 4,337,085 A | 6/1982 | Cichy | |
| 4,663,230 A | 5/1987 | Tennent | |
| 4,960,573 A | 10/1990 | Okutani et al. | |
| 5,102,632 A | 4/1992 | Allen et al. | |
| 5,160,711 A | 11/1992 | Atkinson et al. | |
| 5,165,909 A | 11/1992 | Tennent et al. | |
| 5,171,560 A | 12/1992 | Tennent | |
| 5,302,183 A | 4/1994 | De Boer et al. | |
| 5,424,054 A | 6/1995 | Bethune et al. | |
| 5,431,892 A | 7/1995 | Toyabe et al. | |
| 5,456,897 A | 10/1995 | Moy et al. | |
| 5,500,200 A | 3/1996 | Mandeville et al. | |
| 5,569,635 A | 10/1996 | Moy et al. | |
| 5,643,502 A | 7/1997 | Nashass et al. | |
| 5,691,054 A | 11/1997 | Tennent et al. | |
| 5,707,916 A | 1/1998 | Snyder et al. | |
| 5,783,062 A | 7/1998 | Fogel et al. | |
| 5,965,470 A | 10/1999 | Bening et al. | |
| 6,031,711 A | 2/2000 | Tennent et al. | |
| 6,099,965 A | 8/2000 | Tennent et al. | |
| 6,143,689 A | 11/2000 | Moy et al. | |
| 6,203,814 B1 | 3/2001 | Fischer et al. | |
| 6,333,016 B1 | 12/2001 | Resasco et al. | |
| 6,413,487 B1 | 7/2002 | Resasco et al. | |
| 6,432,866 B1 * | 8/2002 | Tennent et al. | 502/180 |
| 6,761,870 B1 | 7/2004 | Smalley et al. | |
| 6,911,767 B2 | 6/2005 | Takai | |
| 8,318,124 B2 * | 11/2012 | Fujioka et al. | 423/447.3 |
| 2003/0092342 A1 | 5/2003 | Tennent et al. | |
| 2005/0008561 A1 | 1/2005 | Fischer et al. | |
| 2005/0176989 A1 | 8/2005 | Coleman et al. | |
| 2007/0170414 A1 | 7/2007 | Takai et al. | |

FOREIGN PATENT DOCUMENTS

| | | |
|---|---|---|
| WO | 8907163 A1 | 8/1989 |
| WO | 9105089 A1 | 4/1991 |
| WO | 9507316 A1 | 3/1995 |
| WO | 9732571 A1 | 9/1997 |
| WO | 9839250 A1 | 9/1998 |
| WO | 0107694 A1 | 2/2001 |
| WO | 2005016519 A1 | 2/2005 |
| WO | 2006065431 A2 | 6/2006 |
| WO | 2006089193 A2 | 8/2006 |

OTHER PUBLICATIONS

Ivanov et al., 'Catalytic Production and Purification of Nanotubes Having Fullerene-Scale Diameters' in Carbon vol. 33 #12 pgs. 1727-1738 1995 (no month).*
Piers Grumett, Precious Metal Recovery from Spent Catalysts, Platinum Metals Rev., 2003, pp. 163-166, 47 (4).
Jin S. Yoo, Metal Recovery and Rejuvenation of Metal-Loaded Spent Catalysts, Catalysis Today 44, 1998, pp. 27-46.
Philippe Van Maele, Processing Complex Spent Metal-Bearing Catalysts, ptqcatalysis, 2003, pp. 36-37, www.eptq.com.
Christian Hageluken and Michel Verhelst, Recycling of Precious Metal Catalysts, ptqcatalysis, 2004, pp. 21-23, www.eptq.com.

(Continued)

*Primary Examiner* — Stuart Hendrickson
(74) *Attorney, Agent, or Firm* — Laura L. Lee

(57) ABSTRACT

A new method for recovering a catalytic metal and carbon nanotubes from a supported catalyst is provided. The carbon nanotube, including carbon nanotube structures, may serve as the support for the catalytic metal. The valence state of the catalytic metal, if not already in the positive state, is raised to a positive state by contacting the supported catalyst with a mild oxidizing agent under conditions which does not destroy the carbon nanotube. The supported catalyst is simultaneously or subsequently contacted with an acid solution to dissolve the catalytic metal without dissolving the carbon nanotube.

26 Claims, 1 Drawing Sheet

(56) References Cited

OTHER PUBLICATIONS

Baker and Harris, Chemistry and Physics of Carbon, Walker and Thrower ed., vol. 14, 1978, p. 83.

Bethune, D S, et al., "Cobalt-catalysed Growth of Carbon Nanotubes With Single-Atomic-Layer Walls," Nature, vol .363, p. 605-607 (1993).

Dai, H., et al., "Single-Wall Nanotubes Produced by Metal-Catalyzed Disproportionation of Carbon Monoxide," Chemical Physics Letters 260: 471-475 (1996).

de Heer, Walt A., "Nanotubes and the Pursuit of Applications," MRS Bulletin, Apr. 2004.

Guo, T., et al., "Catalytic growth of single-walled nanotubes by laser vaporization," Chem. Phys. Lett., vol. 243: Issues 1-2, pp. 49-54 (1995).

Iijima, S., "Helical microtubules of graphitic carbon," Nature 354:56-58 (1991).

Iijima, S. and Ichihashi,T., "Single-shell carbon nanotubes of 1-nm diameter," Nature, vol.363, pp. 603-605 (1993).

Kitiyanan, B., "Controlled production of single-wall carbon nanotubes by catalytic decomposition of CO on bimetallic Co—Mo catalysts," Chemical Physics Letters, 317:497-503 (2000).

Oberlin, A. & Endo, M., "Filamentous Growth of Carbon Through Benzene Decomposition," J. of Crystal Growth, vol. 32, pp. 335-349 (1976).

Rodriguez, N., "A Review of Catalytically Grown Carbon Nanofibers," J. Mater. Research, vol. 8, pp. 3233-3250 (1993).

Thess, A., et al., "Crystalline Ropes of Metallic Carbon Nanotubes," Science, 273:483-487 (1996).

Weaver, J.H., "Totally Tubular," Science 265 pp. 611-612 (1994).

\* cited by examiner

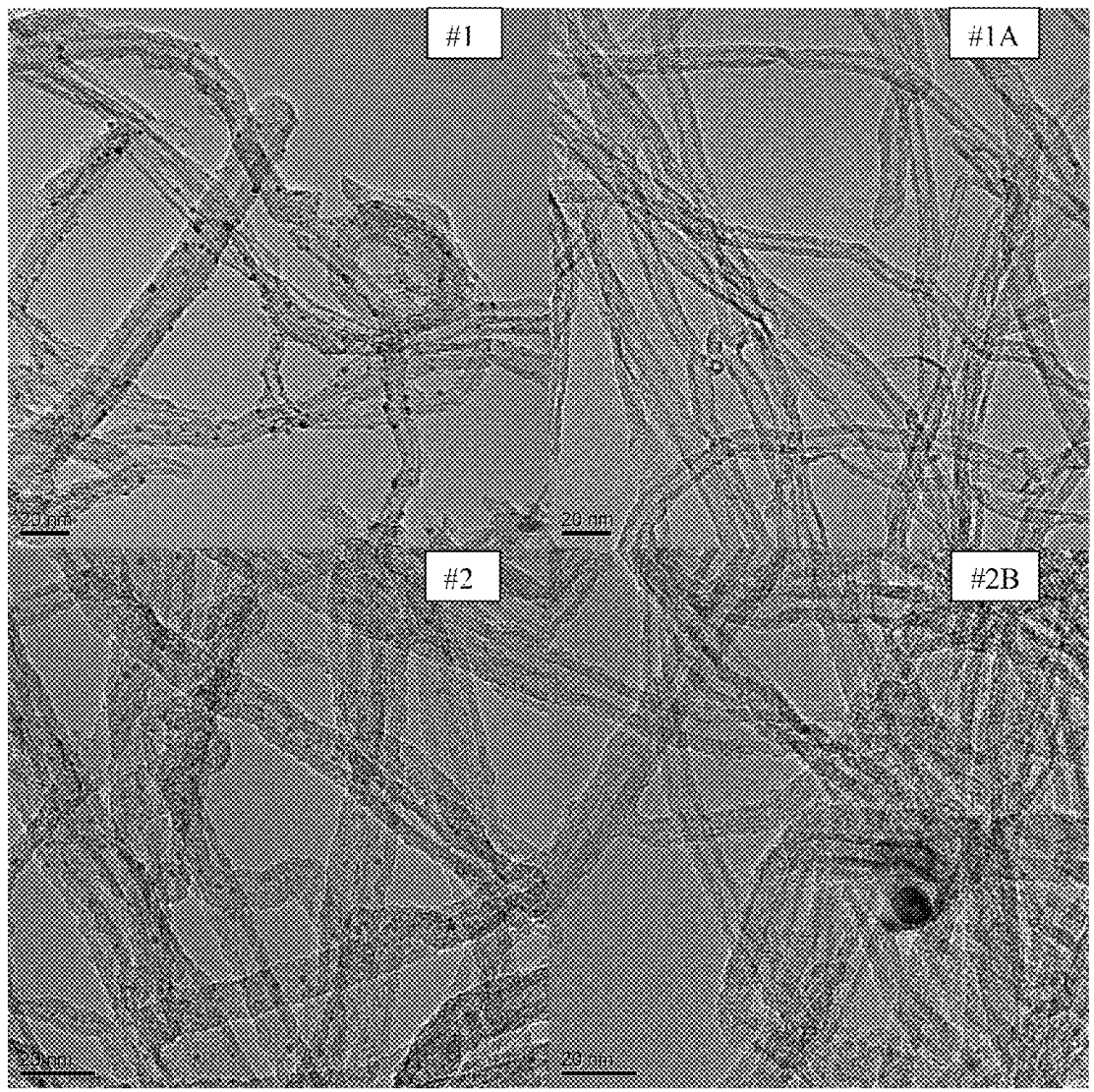

PROCESSES FOR THE RECOVERY OF CATALYTIC METAL AND CARBON NANOTUBES

FIELD OF THE INVENTION

Supported catalysts (i.e., catalytic materials which are supported on some sort of nominally inert surface, structure or support, etc.) are known. Preferably, supported catalysts comprise a catalytic metal and a catalyst support, wherein the catalyst support comprises carbon nanotubes. Most preferably, the metal is a precious metal Pt, Pd, Rh, Ru, Os, Ir, and other transition metals such as Fe, Co, Ni, Mo, etc. Alternatively, the metal is gold.

Although catalysts are formally "not involved" in the reaction they catalyze, they are nevertheless degraded over time. This phenomena of catalyst deactivation may result from side reactions, for example with impurities in the reaction components. Or it may result from a loss of dispersion of metal particles under an extended period of reactions, or from deposition of carbon, sulfur or other reactants, products or by-products that cover the active catalytic sites or clog internal pores and make the catalytic sites inaccessible so as to reduce the overall catalytic activity.

This invention relates to processes for recovering both the catalytic metal, especially the precious metal catalyst, and carbon nanotube component of the catalyst support from a supported catalyst. Recovery of the catalytic metal and carbon nanotube reduces the need for purchasing new metal catalysts and new carbon nanotubes when an existing supported catalyst becomes "spent" or loses its efficacy.

BACKGROUND OF THE INVENTION

Supported Catalysts

Supported catalysts typically comprise a nominally inert support material and a catalytically active material. Because heterogeneous reactions are normally carried out at elevated temperatures (and sometimes at elevated pressures as well) and in a reactive atmosphere, the exact chemical nature of the active catalyst component within the reaction zone can be difficult to determine. Thus, the terms "catalyst" or "supported catalyst" may often be used interchangeably in the industry to refer to the composition comprising both the inert support and catalytically active material that is charged into the reaction zone. Useful catalyst references include "Heterogeneous Catalysis: Principles and Applications," G. C. Bond, 1974, Clarendon Press and "Catalysis", J. J. Spivey, Science Press, book series, vol. 1-18. Both of these references are hereby incorporated by reference.

Supported catalysts may be prepared by, for example, initially depositing precursors of the actual catalytically active material onto the inert support and then optionally treating them (e.g., calcination), before feeding them into the reaction zone. More extensive pre-treatments and passivation steps to stabilize the supported catalyst before feeding to the reaction zone are also common. In a common example, metal salts are deposited onto inert support, converted into metal oxides by calcinations at elevated temperatures and then further reduced in situ to active pure metal catalysts.

Carbon Nanotubes

Carbon nanotubes have been identified as materials of interest for use as catalysts and catalyst supports. Carbon nanotubes exist in a variety of forms and have been prepared through the catalytic decomposition of various carbon-containing gases at metal surfaces. These include those described in U.S. Pat. No. 6,099,965 to Tennent, et al. and U.S. Pat. No. 5,569,635 to Moy, et al, both of which are hereby incorporated by reference.

Carbon nanotubes (also known as fibrils) are vermicular carbon deposits having diameters less than 1.0 µ, preferably less than 0.5 µ, and even more preferably less than 0.2 µ. Carbon nanotubes can be either multi walled (i.e., have more than one graphene layer more or less parallel to the nanotube axis) or single walled (i.e., have only a single graphene layer parallel to the nanotube axis). Other types of carbon nanotubes are also known, such as fishbone fibrils (e.g., wherein the graphene sheets are disposed in a herringbone pattern with respect to the nanotube axis), etc. As produced, carbon nanotubes may be in the form of discrete nanotubes, aggregates of nanotubes (i.e., dense, microscopic particulate structure comprising entangled carbon nanotubes) or a mixture of both.

Processes for forming carbon nanotubes are well known. E.g., Baker and Harris, *Chemistry and Physics of Carbon*, Walker and Thrower ed., Vol. 14, 1978, p. 83; Rodriguez, N., *J. Mater. Research*, Vol. 8, p. 3233 (1993); Oberlin, A. and Endo, M., *J. of Crystal Growth*, Vol. 32 (1976), pp. 335-349; U.S. Pat. No. 4,663,230 to Tennent et al.; U.S. Pat. No. 5,171,560 to Tennent et al.; Iijima, *Nature* 354, 56, 1991; Weaver, *Science* 265, 1994; de Heer, Walt A., "Nanotubes and the Pursuit of Applications," *MRS Bulletin*, April, 2004; etc; "Single-shell carbon nanotubes of 1-nm diameter", S Iijima and T Ichihashi *Nature*, vol. 363, p. 603 (1993); "Cobalt-catalysed growth of carbon nanotubes with single-atomic-layer walls," D S Bethune, C H Kiang, M S DeVries, G Gorman, R Savoy and R Beyers *Nature*, vol. 363, p. 605 (1993); U.S. Pat. No. 5,424,054 to Bethune et al.; Guo, T., Nikoleev, P., Thess, A., Colbert, D. T., and Smally, R. E., Chem. Phys. Lett. 243: 1-12 (1995); Thess, A., Lee, R., Nikolaev, P., Dai, H., Petit, P., Robert, J., Xu, C., Lee, Y. H., Kim, S. G., Rinzler, A. G., Colbert, D. T., Scuseria, G. E., Tonarek, D., Fischer, J. E., and Smalley, R. E., Science, 273: 483-487 (1996); Dai., H., Rinzler, A. G., Nikolaev, P., Thess, A., Colbert, D. T., and Smalley, R. E., Chem. Phys. Lett. 260: 471-475 (1996); U.S. Pat. No. 6,761,870 (also WO 00/26138) to Smalley, et. al; "Controlled production of single-wall carbon nanotubes by catalytic decomposition of CO on bimetallic Co—Mo catalysts," *Chemical Physics Letters*, 317 (2000) 497-503; U.S. Pat. No. 6,333,016 to Resasco, et. al., etc. All of these references are hereby incorporated by reference.

The most preferred way of making carbon nanotubes is by catalytic growth from hydrocarbons or other gaseous carbon compounds, such as CO, mediated by supported or free floating catalyst particles.

Carbon nanotubes may also be formed as aggregates, which are dense microscope particulate structures of entangled carbon nanotubes and may resemble the morphology of bird nest, cotton candy, combed yarn or open net. Aggregates are formed during the production of carbon nanotubes and the morphology of the aggregate is controlled by the choice of catalyst support. Spherical supports grow nanotubes in all directions leading to the formation of bird nest aggregates. Combed yarn and open net aggregates are prepared using supports having one or more readily cleavable planar surfaces, e.g., an iron or iron-containing metal catalyst particle deposited on a support material having one or more readily cleavable surfaces and a surface area of at least 1 square meter per gram. Further details regarding the formation of carbon nanotube aggregates may be found in the disclosure of U.S. Pat. No. 6,143,689 to Moy; U.S. Pat. No.

5,165,909 to Tennent; U.S. Pat. No. 5,456,897 to Moy et al.; Snyder et al., U.S. Pat. No. 5,707,916, filed May 1, 1991, and PCT Application No. US89/00322, filed Jan. 28, 1989 ("Carbon Fibrils") WO 89/07163, and Moy et al., U.S. Pat. No. 5,456,897 filed Aug. 2, 1994 and PCT Application No. US90/05498, filed Sep. 27, 1990 ("Battery") WO 91/05089, and U.S. Pat. No. 5,500,200 to Mandeville et al., filed Jun. 7, 1995 and U.S. Pat. No. 5,456,897 filed Aug. 2, 1994 and U.S. Pat. No. 5,569,635 filed Oct. 11, 1994 by Moy et al., all of which are assigned to the same assignee as the invention here and are hereby incorporated by reference.

Carbon nanotubes are distinguishable from commercially available continuous carbon fibers. For instance, carbon fibers have aspect ratios (L/D) of at least $10^4$ and often $10^6$ or more, while carbon nanotubes have desirably large, but unavoidably finite, aspect ratios (e.g., less than or greater than 100). Furthermore, the diameter of continuous carbon fibers, which is always greater than 1.0μ and typically 5 to 7μ, is also far larger than that of carbon nanotubes, which is usually less than 1.0μ. Carbon nanotubes also have vastly superior strength and conductivity than carbon fibers.

Carbon nanotubes also differ physically and chemically from other forms of carbon such as standard graphite and carbon black. Standard graphite, because of its structure, can undergo oxidation to almost complete saturation. Moreover, carbon black is an amorphous carbon generally in the form of spheroidal particles having a graphene structure, such as carbon layers around a disordered nucleus. On the other hand, carbon nanotubes have one or more layers of ordered graphitic carbon atoms disposed substantially concentrically about the cylindrical axis of the nanotube. These differences, among others, make graphite and carbon black poor predictors of carbon nanotube chemistry.

Additional Carbon Nanotube Structures

In addition to carbon nanotubes, carbon nanotube structures are known to be useful catalyst supports and catalysts. Carbon nanotube structures have greater strength, and thus are less likely to frit or attrit in comparison to other known carbon catalyst supports.

Carbon nanotube structures also provide advantages over other known carbon catalyst supports in that more of the internal porosity is in the form of mesopores (i.e., 2 to 50 nm) and macropores (i.e., greater than 50 nm) as opposed to the usually less desirable micropores (i.e., <2 nm). These carbon nanotube structures include, but are not limited to the following groups: assemblages, networks and rigid porous structures.

a. Assemblages are carbon nanotube structures which have relatively uniform properties along one, preferably two and most desirably three dimensional axis of the three dimensional assemblage. (E.g., U.S. Pat. No. 5,691,054 hereby incorporated by reference). Assemblages may have substantially uniform properties on one or more planes within the assemblage (i.e., they have isotropic physical properties in that plane). Generally, assemblages (including but not limited to mats and plugs) are formed by de-aggregating carbon nanotube aggregates, and then reassembling them to form assemblages which have uniform properties over a greater range of distance than the original aggregates. Nanotube mats or assemblages have been prepared by dispersing carbon nanotubes in aqueous or organic mediums and then filtering the nanotubes to form a mat or assemblage. Mats and plugs have also been prepared by forming a gel or paste of nanotubes in a fluid, e.g. an organic solvent such as propane and then heating the gel or paste to a temperature above the critical temperature of the medium, removing the supercritical fluid and finally removing the resultant porous mat or plug from the vessel in which the process has been carried out. A gluing agent may be present during the step of mat or plug formation. As the assemblage dries, the glue will concentrate at the nanotube intersections. Preferred gluing agents or binders include cellulose-based polymers, hydroxylethyl cellulose, carboxylmethyl cellulose, cellulose, carbohydrates, polyethylene, polystyrene, nylon, polyurethane, polyester, polyamides, poly(dimethylsiloxane), acrylic polymers and phenolic resins. Preferably, the polymers are free of alkali metal salts such as sodium or potassium salts.

b. Networks are formed by linking individual functionalized carbon nanotubes (i.e., carbon nanotubes which contain functional groups, such as but not limited to oxygen containing moieties, on their surface) together by using a linking molecule between the functionalized groups located on the surface of the carbon nanotubes. (E.g., PCT/US97/03553 or WO 97/32571, hereby incorporated by reference). The carbon nanotubes are functionalized, for example, by contacting them with an appropriate reagent such as those described in WO 97/32571 or U.S. Pat. No. 6,203,814, all of which are incorporated by reference. Alternatively, the carbon nanotubes are functionalized through oxidation with oxidizing agents such as potassium chlorate ($KClO_3$), sulfuric acid ($H_2SO_4$), nitric acid ($HNO_3$), hydrogen peroxide ($H_2O_2$), $CO_2$, $O_2$, steam, $N_2O$, NO, $NO_2$, $O_3$, $ClO_2$, etc. (e.g., U.S. Pat. No. 5,965,470, WO 95/07316, PCT/US00/18670 or WO 01/07694, all of which are herein incorporated by reference). Typical linking molecules or linking agents are bifunctional compounds such as diamines, diols, etc.

c. Rigid porous structures are formed by either linking the individual functionalized carbon nanotubes together without the use of a linking molecule, or by gluing carbon nanotube aggregates together with a gluing agent. U.S. Pat. No. 6,099,965, hereby incorporated by reference, discloses that functionalized nanotubes become self adhesive after an appropriate thermal treatment. The carbon nanotubes are functionalized, for example, by contacting them with an appropriate reagent (e.g., WO 97/32571, U.S. Pat. No. 6,203,814, all of which are herein incorporated by reference), or by contacting them with an oxidizing agent such as potassium chlorate ($KClO_3$), sulfuric acid ($H_2SO_4$), nitric acid ($HNO_3$), persulfate, hydrogen peroxide ($H_2O_2$), $CO_2$, $O_2$, steam, $N_2O$, NO, $NO_2$, $O_3$, $ClO_2$, etc. (e.g., U.S. Pat. No. 5,965,470, WO 95/07316, PCT/US00/18670 or WO 01/07694, all of which are herein incorporated by reference). The oxidized nanotubes are believed to form ester, anhydride, lactone and ether bonds between themselves.

It is useful to note that assemblages and rigid porous structures as defined above, are essentially "pure nanotubes" admixed, at most with a minor amount of gluing agent. Networks, on the other hand, because of the presence of the "linker" and the availability of linker molecules of various molecular weights and structures provide an additional degree of control on the properties of the final structure. In particular, density and porosity can be tailored.

Recovering the Catalytic Metal from a Supported Catalyst

There are several reasons why a supported catalyst may become spent/deactivated or lose its efficacy. For example, the surface of the metal catalyst/catalytic metal itself may become covered with ash or other amorphous carbon or other by products. The metal catalyst themselves may coalesce so as to reduce the total surface area available for the desired reaction. If the catalyst is located inside a support structure, the pores may become clogged or plugged, thereby preventing reactants from reaching the catalyst itself.

Because of the rarity and value of platinum group metals (Pt, Pd, Rh, Ru, Ir, Os, etc.) it is desirable to recover them from deactivated catalysts. Other catalytic metals or catalysts such as nickel and gold are valuable to recover.

This recovery has heretofore been typically accomplished by first destroying the support material and dissolving the noble metals in strong oxidizing acid such as aqua regia at high temperatures. This dissolution process was dangerous due to the strong oxidizing acid, and also due to the large amount of heat required to maintain the high temperature for oxidation. Additionally, the use of strong oxidizing acids can release dangerous nitrous oxide ($NO_x$) contaminants.

The first step of such previous recovery processes was typically to burn away the carbon support by calcining in an oxidizing atmosphere, thus significantly reducing the volume of material and increasing the concentration of previous metal to be recovered. As activated charcoal or carbon black was inexpensive and difficult to recover due to its amorphous or weak structure, it was considered more cost effective to purchase new activated carbon or carbon black instead of recovering, reactivating and reusing the same carbon black or activated carbon.

However, the use of carbon nanotubes or carbon nanotube structures as the support material for the catalyst present a different set of circumstances for recovery. As described previously, carbon nanotubes contain organized layers of carbon atoms, and thus have far superior strength and resistance properties than carbon black or activated charcoal (e.g., would not burn off as easily during calcining). Yet, carbon nanotubes are more expensive than carbon black or activated charcoal, and thus it would not be desirable to destroy them either (e.g., with a strong oxidizing acid such as aqua regia).

As a result, there is a need for a new method for recovering both the catalytic metal and the carbon nanotubes from a supported catalyst, wherein the supported catalyst comprises a catalytic metal and carbon nanotubes.

SUMMARY OF THE INVENTION

A process for recovering a catalytic metal and carbon nanotubes from a supported catalyst is provided. The supported catalyst comprises a catalytic metal and carbon nanotubes. The carbon nanotubes serve as the support for the catalytic metal. The process comprise the steps of contacting said supported catalyst with an appropriate solvent such as an acid solution under reaction conditions to dissolve the catalytic metal into the solvent, and recovering the catalytic metal and carbon nanotubes. If necessary, the spent supported catalyst may be first contacted with an oxidizing agent under reaction conditions to raise the valence state of the spent catalytic metal. The recovered carbon nanotubes of the catalyst support retain one or more physical characteristic which is at least 95% of their original values.

Other improvements which the present invention provides over the prior art will be identified as a result of the following description which sets forth the preferred embodiments of the present invention. The description is not in any way intended to limit the scope of the present invention, but rather only to provide a examples of the presently preferred embodiments.

BRIEF DESCRIPTION OF THE DRAWINGS

The accompanying drawings, which are incorporated in and constitute a part of the specification, illustrate an exemplary embodiment of the present invention.

FIG. 1 shows TEM images of Pd/CNT catalysts and CNTs after metal recovery prepared in accordance with Examples 1-4.

DETAILED DESCRIPTION OF THE INVENTION

All patents, patent applications, and patent publications referred to herein are incorporated by reference in their entirety.

The terms "nanotube", "nanofiber" and "fibril" are used interchangeably to refer to single walled or multiwalled carbon nanotubes. Each refers to an elongated structure preferably having a cross section (e.g., angular fibers having edges) or a diameter (e.g., rounded) less than 1 micron (for multi-walled nanotubes) or less than 5 nm (for single walled nanotubes). The term "nanotube" also includes "buckytubes" and fishbone fibrils.

"Carbon nanotube structure" refers to any structures made from carbon nanotubes, including but not limited to aggregates, assemblages, networks, plugs, rigid porous structures, etc.

Methods of the Exemplary Embodiments

The present invention provides new processes for recovering the catalytic metal and carbon nanotubes from a supported catalyst. The carbon nanotube may be in individual form, or may be in the form of a carbon nanotube structure (e.g., aggregate, assemblage, rigid porous structure, etc.)

The supported catalyst may be used or unused. If used, the supported catalyst may be partially or fully spent, deactivated, or inactive for any number of reasons.

In an exemplary embodiment, the catalytic metal and carbon nanotubes are recovered by contacting the supported catalyst with an appropriate solvent (e.g., acid solution) under conditions which will dissolve or solubilize the catalytic metal and not affect the carbon nanotubes. Depending on the condition of the catalytic metal within the supported catalyst, certain pretreatments of the supported catalyst may be needed in order for the spent catalytic metal to dissolve into the acid solution.

Oxidation of the Catalytic Metal

One of ordinary skill in the art would recognize that precious metals such as Pd normally need to be in a positive valence state (i.e., +2) in order to be dissolved in an acid solution. As previously discussed, the actual valence state of catalytic metals on spent catalysts may not be known. Thus, if the catalytic metal of the supported catalyst is not in a positive valence state, then the supported catalyst may be oxidized in order to raise the valence of the catalytic metal. However, the oxidizing agent used must be one which will not destroy the carbon nanotubes which make up the catalyst support. Thus, in one embodiment, the supported catalyst is contacted with an appropriate oxidizing agent which will oxidize the catalytic metal to a positive valence state while not significantly attacking the carbon nanotubes which make up the catalyst support. It should be understood that a simple functionalization of the surface of the carbon nanotubes can be easily reversed—if desired—by heat treatment and in fact, may be beneficial if, for example, the nanotubes are to be reassembled in a catalyst support or other rigid porous structure as described in U.S. Pat. No. 6,099,965, herein incorporated by reference.

Where the catalyst support is a carbon nanotube structure, it is preferred that the oxidizing agent also not cause the carbon nanotube structure to come apart or unravel (e.g., destroy the glue or binder, if any are present, which hold the carbon nanotube structure together). Thus, in another embodiment, the supported catalyst is contacted with an appropriate oxidizing agent which will oxidize the catalytic metal to a positive valence state and will not destroy the carbon nanotube structure which make up the catalyst support.

In one embodiment, the catalytic metal may be oxidized by contacting the supported catalyst in the presence of air or other oxygen containing gases (e.g., carbon monoxide, carbon dioxide, oxygen, etc.) For example, supported catalysts in which hydrogen atoms remain on the surface of the catalytic metal (e.g., supported catalysts removed directly from a hydrogenation reaction chamber) can be oxidized merely by exposure to air alone since the oxygen in air will react with the hydrogen on the catalytic metal surface to oxidize the catalytic metal and raise its valence state. This type of oxidation reaction (i.e., exposure to low concentration of oxygen containing gas) will not affect the carbon nanotubes or carbon nanotube structures which make up the catalyst support.

In another exemplary embodiment, the supported catalyst, irrespective of the condition of the catalytic metal, can be first reduced by contacting with a gaseous reducing agent such as hydrogen or a liquid media such as formaldehyde or formic acid. It is believed that this method would lead to a greater concentration of hydrogen atoms onto the surface of the catalytic metal. The reduced supported catalyst can then be flash oxidized by exposing it to a high concentration of oxygen containing gas. It is believed that the abundance of oxygen containing gas rapidly reacts with the hydrogens on the catalytic metal surface and consequently generate a lot of heat (hence the term flash-oxidized). Alternatively, a supported catalyst or the reduced supported catalyst may be oxidized with an oxidizing agent (e.g., nitric acid, hydrogen peroxide, $Ce^{+4}$, permanganate, percarbonate, perchromate, etc) under mild oxidation conditions (i.e., temperature between 80-90° C.) so as to limit any damage to the carbon nanotubes in the catalyst support.

Dissolving the Catalytic Metal

Once the catalytic metal is in a positive valence state, the catalytic metal is then dissolved in an appropriate solvent such as an acid solution.

In one embodiment, the step of dissolving the catalytic metal can be performed as a separate step from the step of oxidizing the supported catalyst to raise the valence state of the catalytic metal. To dissolve the catalytic metal, a non-oxidizing acid solution such as hydrochloric acid may be used. Other acid solution such as nitric acid and sulfuric acid may also be used.

In an alternative embodiment, the catalytic metal can be oxidized (to raise the valence state) and dissolved simultaneously. For example, the supported catalyst can be contacted with a mixture containing both an oxidizing agent (to raise the valence of the catalytic metal) and a non-oxidizing acid (to dissolve the oxidized catalytic metal). When using this embodiment, one of ordinary skill in the art would understand that the mixture comprise an appropriate mixture of oxidizing agent and non-oxidizing acid components such that the catalyst support (e.g., the carbon nanotube or carbon nanotube structure) is not destroyed by the oxidizing agent.

In an exemplary embodiment, such mixtures include mixtures of oxidizing agents such as nitric acid or hydrogen peroxide and non-oxidizing acid solutions such as hydrochloric acid (HCl).

Recovering the Catalytic Metal and Carbon Nanotubes

Once the catalytic metal has been dissolved, then recovering the catalytic metal and the carbon nanotube supports are done using any conventional methods known for liquid-solid separation. These include decantation, filtration, centrifugation, etc.

Once the solid carbon nanotubes have been separated from the liquid mixture, electrochemical or other conventional liquid separation/recovery processes can then be used to separate/recover the dissolved catalytic metal from the solvent/acid solution.

In an exemplary embodiment, the methods of present invention can result in the recovery of at least 70% of the precious catalytic metal from the original supported catalyst sample. In another embodiment, at least 80% of the original precious catalytic metal are recovered from the original supported catalyst sample, more preferably, at least 90% or 95% may be recovered.

Additionally, while recovering the catalytic metal in the amount described previously, at least 80% of the carbon nanotubes may be recovered from the original supported catalyst sample. In another embodiment, at least 90% of the carbon nanotubes may be recovered. The recovered carbon nanotube structures may retain one or more physical characteristic within 95% of their original value. For example, the recovered carbon nanotube extrudates may exhibit a crush strength which is at least 95% the value of their original crush strength. The recovered carbon nanotube structures may also exhibit one or more physical characteristic such as crush strength which is greater than their original values.

The recovered carbon nanotubes may be reconstituted into catalyst support or utilized for any other application, including as an additive for conductive plastics (e.g., U.S. Pat. No. 5,643,502 to Nahass, et al.), as an electrode (e.g., U.S. Pat. No. 6,031,711 to Tennent et al., and U.S. Published Application No. US-2005-0008561-A1 to Fischer et al.), or as a component of a field emission cathode (e.g., U.S. Pat. No. 6,911,767 to Takai and U.S. Published Application No. 2007-0170414-A1 to Takai et al.) for which carbon nanotubes can be employed. All of these U.S. patents and Published applications are hereby incorporated by reference.

EXAMPLES

The following examples serve to provide further appreciation of the invention but are not meant in any way to restrict the scope of the invention.

Example 1

1 gram of 1% Pd/CNT extrudate catalyst (Sample 1) was made by incipient impregnation method. The catalyst was placed in a 100-mL round bottom flask and 50 mL 63% HNO3/37% HCl (1:6) acid mixture was added to the sample. Sample 1 was treated with the acid mixture overnight at room temperature without agitation. The sample was washed with deionized water and dried at 110° C. for 12 hours, and marked as Sample 1A. The reaction can be described as follows:

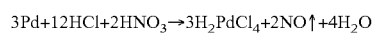

$$3Pd+12HCl+2HNO_3 \rightarrow 3H_2PdCl_4+2NO\uparrow+4H_2O$$

Example 2

1 gram of 5% Pd/CNT powdered catalyst (Sample 2) was prepared by incipient wetness impregnation of Pd nitrate. The Pd recovery was carried out using the same procedure as described in Example 1. The treated sample was collected as Sample 2A.

Example 3

1 gram of Sample 1 was placed in a 250-mL round bottom flask and 50 mL formic acid was added to the sample. After the reaction proceeded for 30 minutes, the sample was filtered and washed with deionized water. The washed sample was then re-placed in the flask and 100 mL mixture of 6N HCl and 10M $H_2O_2$ was added to the sample. The flask was heated to about 70° C. and maintained at this temperature for 2 hours. Finally, the sample was washed and dried at 110° C. for 12 hours and marked as Sample 1B. The reaction can be described as:

$$Pd+H_2O_2+4HCl \rightarrow H_2PdCl_4+2H_2O$$

Example 4

1 gram of Sample 2 was placed in a 250-mL round bottom flask and the same procedure as described in Example 3 was followed. The recovered sample was marked as Sample 2B.

Example 5

1 gram of Sample 1A was placed in a 250-mL three-neck round bottom flask with overhead stirrer. 5% hydrogen in argon was passing through one port and exiting another at rate of 50 mL/min. The flask was then heated to 300° C. for 1 hours to ensure a complete reduction. Then the flask was cooled down till 120° C. The reducing gas was switched to argon for 5 minutes and then to air to oxidize the catalyst at 120° C. for 1 hour. Finally, the flask was cooled to room temperature and 100 mL 37% HCl was added to flask and the reaction was allow to carry for 24 hours. Final sample was collected after filtering and washing and marked as Sample 1C.

Example 6

CO chemisorption was carried out using Quanta chrome Autosorb 1C/TCD in order to determine the residue quantity of Pd on the catalyst support. The sample was first reduced at 300° C. by hydrogen for 30 minutes. The chemisorption was then determined by subtraction of irreversible adsorption from total adsorption. The results were shown in Table 1. As seen in the table, various method can remove Pd from carbon nanotube surface and the recovery degree varied from 70 to 100%.

TABLE

CO Chemisorption (µmol/g) of Pd/CNT catalyst before and after recovery tests

| Sample ID | Before | After | % Pd Recover |
|---|---|---|---|
| 1 | 42.4 | — | — |
| 1A | 42.4 | 12.2 | 71 |
| 1B | 42.4 | 6.45 | 85 |
| 1C | 12.2 | 1.08 | 91 |
| 2 | 209.3 | — | — |
| 2A | 209.3 | 0.156 | ~100 |
| 2B | 209.3 | 9.59 | 95 |

Example 7

Transmission electron microscope was applied to check the existence of recovered carbon nanotubes. As shown clearly in FIG. 1, most Pd particles have been removed from carbon nanotubes. There is no visual evidence of further damages or modifications to the nanotube structure.

Example 8

The recovered carbon nanotube extrudate, Sample 1B, was tested for crush strength and shown comparable value as original extrudate sample. A few grams of recovered extrudate was further placed in a 1-inch quartz reactor and annealed in argon at 600° C. for 1 hour. The crush strength improved three-fold as compared to original extrudate support.

We claim:

1. A process for making, using, and recovering components of a supported catalyst, said supported catalyst comprising catalytic metal on a carbon nanotube support,
   said process comprising the steps of:
      applying said catalytic metal to preformed carbon nanotubes to make said supported catalyst, wherein said preformed carbon nanotubes provide said carbon nanotube support;
      using said supported catalyst for a catalytic reaction;
      dissolving said supported catalyst with a solvent to dissolve said catalytic metal into said solvent; and
      recovering said catalytic metal and carbon nanotubes.

2. The process of claim 1, further comprising contacting said supported catalyst with an oxidizing agent to raise the valence state of the catalytic metal on said supported catalyst prior to the step of contacting said supported catalyst with a solvent.

3. The process of claim 1, wherein said dissolving said supported catalyst with a solvent comprises dissolving said catalytic metal into an acid solution.

4. The process of claim 1, wherein said recovering said catalytic metal and carbon nanotubes comprises recovering carbon nanotubes of said supported catalyst to retain one or more physical characteristic of at least 95% of their original value.

5. The process of claim 1, further comprising contacting said supported catalyst with an oxidizing agent selected from the group consisting of nitric acid, hydrogen peroxide, permanganate, percarbonate, and perchromate.

6. The process of claim 1, wherein said dissolving said supported catalyst with a solvent comprises dissolving said catalytic metal into a solvent selected from the group consisting of hydrochloric acid, nitric acid, and sulfuric acid.

7. The process of claim 1, further comprising oxidizing said supported catalyst with an oxidizing agent to raise the valence state of the catalytic metal on said supported catalyst, wherein said oxidizing step and said dissolving step occur concurrently.

8. The process of claim 1, wherein said recovering of said carbon nanotubes recovers carbon nanotube structures, which exhibit a crush strength of at least 95% of the crush strength of the preformed carbon nanotubes, which are preformed carbon nanotube structures.

9. The process of claim 1, wherein said recovering of carbon nanotubes recovers carbon nanotubes which exhibit a crush strength greater than the crush strength of the preformed carbon nanotubes.

10. The process of claim 1, wherein said applying said catalytic metal to preformed carbon nanotubes to make said supported catalyst comprises applying a catalytic metal selected from the group consisting of Pt, Pd, Rh, Ru, Os, Ir, and Au to said preformed carbon nanotubes.

11. The process of claim 1, wherein said recovering of said catalytic metal and carbon nanotubes comprises:
  separating said carbon nanotubes from said solvent; and
  recovering said catalytic metal from said solvent.

12. The process of claim 1, wherein said dissolving said supported catalyst with a solvent comprises dissolving said supported catalyst into hydrochloric acid or sulfuric acid.

13. The process of claim 1, wherein said recovering of said catalytic metal and carbon nanotubes comprises recovering at least 70% of said catalytic metal from said supported catalyst.

14. The process of claim 1, wherein said recovering of said catalytic metal and carbon nanotubes comprises recovering at least 80% of said carbon nanotubes from said supported catalyst.

15. A method of recovering a catalytically active material from a preformed inert support material, comprising:
  providing the catalytically active material on an exterior surface of the preformed inert support material, wherein the inert support material comprises a plurality of carbon nanotubes; and
  recovering the catalytically active material from the exterior surface of the plurality of carbon nanotubes, wherein the recovering comprises:
    contacting the catalytically active material with a solvent to dissolve the catalytically active material;
    recovering at least 70% of the catalytically active material in a reusable state; and
    recovering at least a portion of the plurality of carbon nanotubes, wherein the recovered plurality of carbon nanotubes retain one or more physical characteristic which is at least 95% of their original value.

16. The method of claim 15, wherein the recovering of the portion of the plurality of carbon nanotubes comprises recovering at least 80% of the plurality of carbon nanotubes from the preformed inert support material.

17. The method of claim 15, wherein the providing the catalytically active material on the exterior surface of the preformed inert support material, comprises:
  providing the plurality of carbon nanotubes;
  depositing precursors of the catalytically active material on to the exterior surface of the plurality of carbon nanotubes; and
  reacting the precursors of the catalytically active material to form the catalytically active material on the plurality of carbon nanotubes.

18. The method of claim 15, wherein the contacting the catalytically active material with the solvent comprises contacting the catalytically active material with an acid solution.

19. The method of claim 15, further comprising contacting the catalytically active material on the exterior surface of the preformed inert support material with an oxidizing agent to raise the valence state of the catalytically active material.

20. A method, comprising:
  providing a supported catalyst with degraded catalytic activity, wherein the supported catalyst with degraded catalytic activity comprises a catalytically active material with degraded catalytic activity supported on carbon nanotubes;
  removing the catalytically active material with degraded catalytic activity from at least a portion of the carbon nanotubes; and
  recovering the catalytically active material with degraded catalytic activity and at least a portion of the carbon nanotubes from the supported catalyst.

21. The method of claim 20, wherein providing the supported catalyst with degraded catalytic activity comprises:
  providing a supported catalyst with degraded catalytic activity, wherein the degraded catalytic activity is caused by:
    coalescing of the catalytic active material to reduce catalytic surface area of the catalytic active material;
    deactivation of the catalytic active material by side reactions;
    loss of dispersion of the catalytic active material on at least a portion of the carbon nanotubes; and/or
    deposition of carbon, ash, sulfur, or products or by-products of the catalytic active material, carbon nanotubes, or other reactants that cover active catalytic sites, clog internal pores, and/or make catalytic sites inaccessible.

22. The method of claim 20, wherein removing the catalytically active material with degraded catalytic activity from at least a portion of the carbon nanotubes comprises dissolving or solubilizing the catalytically active material in a solvent, and
  wherein recovering the catalytically active material with degraded catalytic activity and at least a portion of the carbon nanotubes from the supported catalyst comprises:
    separating at least a portion of the carbon nanotubes from the solvent and the catalytically active material; and
    separating the solvent from the catalytically active material.

23. The method of claim 22, wherein removing the catalytically active material with degraded catalytic activity from at least a portion of the carbon nanotubes further comprises reducing or oxidizing the catalytically active material to assist in dissolving or solubilizing the catalytically active material in the solvent.

24. The method of claim 20, further comprising:
  annealing at least a portion of the recovered carbon nanotubes, wherein the crush strength of the annealed recovered carbon nanotubes exceeds the crush strength of the recovered carbon nanotubes.

25. The method of claim 20, wherein recovering the catalytically active material with degraded catalytic activity comprises recovering at least 70% of the catalytically active material.

26. The method of claim 20, wherein the recovering of the at least a portion of the carbon nanotubes from the supported catalyst comprises recovering at least a portion of carbon nanotube structures from the supported catalyst.

* * * * *